United States Patent
Robnett, II

(10) Patent No.: US 7,467,805 B2
(45) Date of Patent: Dec. 23, 2008

(54) COUPLER LOCKING DEVICE

(76) Inventor: Thomas Robnett, II, 302 Ferguson, Wald, TX (US) 76712

( * ) Notice: Subject to any disclaimer, the term of this patent is extended or adjusted under 35 U.S.C. 154(b) by 138 days.

(21) Appl. No.: 11/379,857

(22) Filed: Apr. 24, 2006

(65) Prior Publication Data

US 2007/0246912 A1    Oct. 25, 2007

(51) Int. Cl.
B60D 1/60    (2006.01)
(52) U.S. Cl. .................. 280/507; 280/511; 280/512
(58) Field of Classification Search ........... 280/508, 280/511, 512; 70/2
See application file for complete search history.

(56) References Cited

U.S. PATENT DOCUMENTS

| | | | | |
|---|---|---|---|---|
| 2,571,349 | A * | 10/1951 | Eckles | 70/14 |
| 3,237,969 | A * | 3/1966 | Geresy | 280/507 |
| 3,374,268 | A * | 3/1968 | Groves | 280/512 |
| 3,759,549 | A | 9/1973 | Morris | |
| 4,133,553 | A | 1/1979 | Pierce | |
| 4,157,190 | A | 6/1979 | Nyman | |
| 4,896,518 | A * | 1/1990 | Appelgren | 70/54 |
| 5,378,008 | A * | 1/1995 | McCrossen | 280/507 |
| 5,476,281 | A * | 12/1995 | Worthington | 280/507 |
| 5,582,420 | A * | 12/1996 | Ulbrich | 280/507 |
| 5,947,506 | A * | 9/1999 | Bauer | 280/507 |
| 6,186,532 | B1 * | 2/2001 | Ray et al. | 280/508 |
| 6,722,686 | B2 | 4/2004 | Koy | |
| 6,976,695 | B1 | 12/2005 | Smith, III | |
| 7,100,937 | B2 * | 9/2006 | Hogan | 280/507 |
| 2004/0075240 | A1 * | 4/2004 | Staggs | 280/416.1 |
| 2005/0039498 | A1 | 2/2005 | Budge | |

* cited by examiner

Primary Examiner—Lesley D Morris
Assistant Examiner—Maurice Williams
(74) Attorney, Agent, or Firm—Aaron M. Wilkerson

(57) ABSTRACT

The present invention provides a locking device for a hinged, body and cap trailer coupler to prevent unauthorized use of an unattended and unattached trailer. The device consists of a cylindrical bar member joined to an elongated tongue member. The elongated tongue member is sized for insertion between the body and cap portion of a trailer coupler in the open position such that the cap portion is forced against the sliding collar of the trailer coupler, preventing the trailer coupler from closing on the ball of a tow vehicle. The elongated tongue member provides a slotted hole portion to receive the shackle of a padlock to lock the system in place.

2 Claims, 3 Drawing Sheets

COUPLER LOCKING DEVICE

BACKGROUND OF THE INVENTION

1. Field of the Invention

The present invention is directed toward locking devices for trailer couplers. In particular, the present invention provides a discreet, effective, inexpensive locking device to prevent unauthorized towing of a trailer to which the coupler is attached by preventing access to the socket portion of the coupler.

2. Background Information

From the construction industry to weekend recreation, more and more uses are developing for trailers coupled and towed with the typical ball and socket configuration. This standard configuration has developed and thrived for its simplicity, effectiveness, and ease of use. Furthermore, to meet the varied types of tow vehicles and trailers, standard sizes of the ball and socket couplers have been developed, to ensure compatibility between a tow vehicle (using the standard ball size) and a multitude of trailers (using a standard coupler). Unfortunately, this leads to the inevitable situation of not only allowing, but in effect, facilitating unauthorized trailer use, or more often, trailer theft of unattended and unattached trailers. In fact, as any construction contractor can testify, trailer theft has effectively become a cost of doing business in the industry.

In addition to standard sized ball and socket configurations, standard types of socket couplers have been developed as well. Most significantly is the development of the vertically hinged, body and cap style coupler as described in U.S. Pat. No. 4,133,553, which is herein incorporated by reference. This coupler style is comprised of a body portion vertically hinged to a cap portion. The cap portion rotates to its closed position, wherein it forms a socket with the body portion, which encloses the ball from the tow vehicle. A sliding collar may then be moved into position to engage the body and cap, keeping them in their closed position. In this position, if the ball from the tow vehicle is engaged, the collar prevents disengagement. In order to disengage the ball from the tow vehicle, the collar from the socket must slide back. Once the collar slides back, the cap portion rotates outward just enough to allow disengagement of the ball from the tow vehicle, where it is prevented from further opening by the shape and design of the cap portion. The device may then only be lockingly engaged with the ball of a tow vehicle by again rotating the collar closed and sliding the collar back into place. In other words, unless the collar is allowed to slide back over the closed cap and body portion of the coupler, the socket will not lockingly engage the ball of a tow vehicle. This design, currently known in the art as the BULLDOG coupler, is popular for its durability, effectiveness, and ease of use. Again, however, as this coupler design is also manufactured to fit the standard sized tow ball, it is just as susceptible to unauthorized use or theft of its unattended and unattached trailer as its counterparts.

In an effort to counter trailer theft, a large number of devices have been developed in an attempt to lock the coupler, thus preventing theft of unattended and unattached trailers. Typically, this has involved a visibly exposed and easily accessible padlock or similar locking device. For instance, in U.S. Pat. No. 6,976,695, Smith, III discloses a coupler lock assembly comprised of two hinged members, which close around the coupler adjacent to the sliding collar of the coupler, preventing the sliding coupler from moving to the open position. The device of Smith, III is then locked into position with a standard padlock as known in the industry, mounted atop the device. This device works well for ensuring that the collar stays in the closed position; however, it readily displays the locking mechanism atop the device of an unattended trailer allowing potential thieves to easily "scope" the target from afar and ensure they have the necessary tools to cut or break the lock, potentially resulting in yet another stolen trailer.

To cope with the problem of exposed padlocks, several bulkier devices have been developed that incorporate a locking mechanism into a larger piece of equipment. Koy, in U.S. Pat. No. 6,772,686, discloses a device that completely encloses the socket of a trailer coupler and integrates into that mechanism an internal locking device. This device has a large bottom portion with an integral ball, which fits into the socket portion of a coupler when in place. Further, the device has a top portion, a unshaped bar, which slides over the top of the coupler and locks into the bottom portion of the device, thus preventing engagement of the coupler to the ball of a tow vehicle. Although the bulkier and more complex design makes the device more difficult to break into, it also increases the difficulty and cost of manufacture. Additionally, this locking mechanism is designed to be used and successfully works as somewhat of a deterrent to a thief looking for the easiest target. However, in visibly working as a deterrent, the device also works as a signal to potential thieves "scoping" the target trailer as to exactly what tools will be needed to complete the theft such as a sledgehammer or cutting torch. Hence, although clearly not the easiest target, these mechanisms still result in stolen trailers because they are easily recognizable by the potential thief from afar.

In view of the limitations of products currently known in the art, a tremendous need exists for a trailer coupler locking device that is discreet, effective, and inexpensive to manufacture. Applicant's invention, by its novel design provides a solution in view of currently available devices.

SUMMARY OF THE INVENTION

In view of the foregoing, it is an object of the present invention to provide a device for preventing unauthorized trailer use that is extremely effective.

It is another object of the present invention to provide a device for preventing unauthorized trailer use that is extremely discreet in use.

It is another object of the present invention to provide a device for preventing unauthorized trailer use that is small in size.

It is another object of the present invention to provide a device for preventing unauthorized trailer use that is simple to manufacture.

It is another object of the present invention to provide a device for preventing unauthorized trailer use that is inexpensive to manufacture.

It is another object of the present invention to provide a device for preventing unauthorized trailer use that is extremely difficult to disable.

In satisfaction of these and other related objectives, the present invention provides such a device for preventing unauthorized trailer use. The device, although simplistic is not only novel in concept, but it is also unobvious in view of the current state of the art in coupler locking devices. The device is so arranged as to provide an efficient locking mechanism for preventing theft of an unattended and unattached trailer, but it is also arranged as to be virtually undetectable from all but a close inspection.

The device of the present invention incorporates a cylindrical bar member attached to an elongated tongue member through a welding process as presently known in the art. The elongated tongue member is further characterized by a through slot configured to accept a typical padlock shackle as presently known in the art. The novelty of the present invention lies in both its configuration and in its sizing, which is such that the elongated tongue member may be inserted in between the cap and body portions of the BULLDOG style coupler while the coupler is in the open position and the collar is disengaged. The result is such that only the cylindrical bar member is visible from the top side of the coupler. Furthermore, the elongated tongue member forces the body and cap member of the coupler apart such that the sliding collar member cannot be reengaged, thus preventing the coupler from closing. Finally, a typical padlock may be used to lock the present invention in place by inserting the padlock shackle through the slot in the elongated tongue member in the socket portion of the coupler.

The device of the present invention provides a simple, yet elegant solution to the existing deficiencies in the current state of the art of coupler locking mechanisms. First and foremost, the present invention, when properly installed, prevents the unauthorized use of an unattended and unattached trailer by locking the coupler into a position in which the ball from a tow vehicle cannot engage the socket from the trailer coupler. Secondly, the device of the present invention is simple and inexpensive to manufacture. The device merely consists of two members attached by welding methods as known in the art; furthermore, the device has no moving parts. In fact, the simplicity and cost effectiveness of this design of the present invention is demonstrative of both its novelty and unobviousness compared to the complexity of the current locking devices in the current state of the art. Thirdly, the device of the present invention is extremely discreet. From a standing position, even just feet away from the engaged device, a potential thief would merely notice the cylindrical bar positioned as if it were a part of the coupler device itself. Even upon closer inspection, the lock mechanism is barely visible beneath the socket portion of the coupler. Therefore, not until an attempt was made to mount the coupler to the ball of a tow vehicle would the potential thief realize that any locking mechanism existed at all. Finally, even if the potential thief were to notice the locking mechanism, they would still be deterred as the device of the present invention is extremely difficult to remove without the key or combination to the padlock. As previously stated, all that extends above the coupler itself is a cylindrical bar member; thus, the use of a sledgehammer or cutting torch would likely inflict more damage to the trailer coupler than the device of the present invention. Furthermore, only the tip of a padlock is visible on the underneath side of the coupler; thus, attempts to cut or knock the lock off are likely to be unsuccessful as well.

In summary, then, an embodiment of the present invention provides a device for extremely effective prevention of unauthorized towing of an unattended and unattached trailer in a discreet, highly cost-effective, small package. Moreover, the device of the present invention provides a novel and non-obvious solution in view of the current state of the prior art of coupler locking devices by providing a design that, in use, is not only difficult to overcome but is difficult to even detect from almost any distance.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Figure 1:
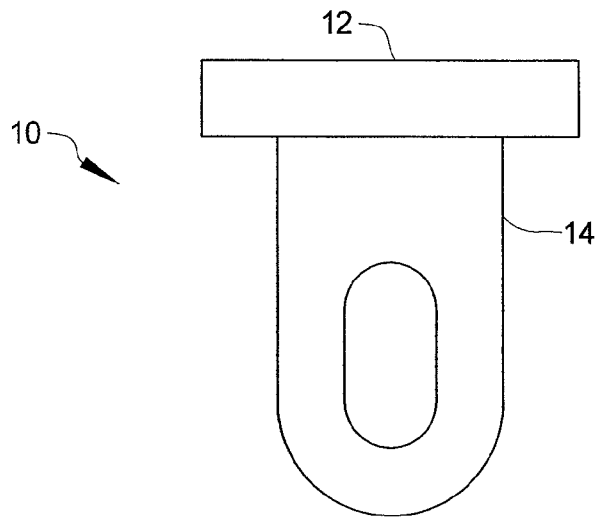
FIG. 1 is a top plan view of the device of the present invention.
Figure 2:
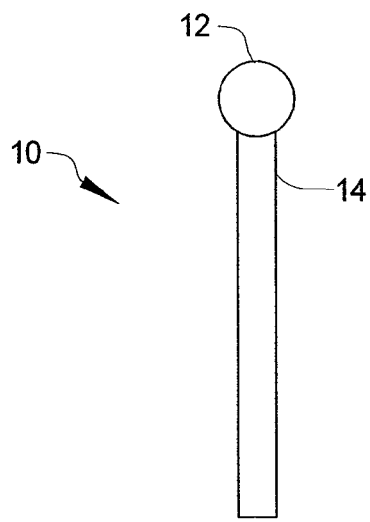
FIG. 2 is a side view of the device of the present invention.
Figure 3:
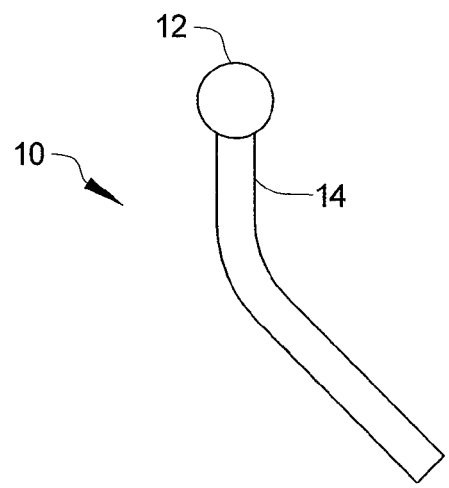
FIG. 3 is a side view of an alternate embodiment of the device of the present invention.

Referring to FIGS. 1, 2, and 3, a device for preventing the unauthorized use of unattended and unattached trailers is shown and is generally designated by the numeral 10. Device 10 is comprised of cylindrical bar member 12 and elongated tongue member 14 attached by conventional means as known in the art. In the preferred embodiment, cylindrical bar member 12 and elongated tongue member are made of mild steel, welded together by conventional means; however, other alloys and suitable materials, such as high-strength steel or variations thereof and suitable welding or other attachment means are contemplated as well. Finally, elongated tongue portion 14 houses a slotted hole such that a conventional padlock shackle as known in the art can be inserted and locked.

Figure 5:
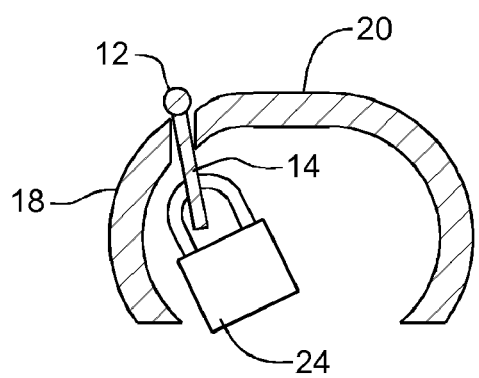
FIG. 5 is a cross-sectional view of the device of the present invention along lines 5-5 of FIG. 4.

As best seen in FIG. 5, device 10 is properly sized to fit in the gap of a hinged body and cap trailer coupler 16. That is, elongate tongue member 14 is sized such that it can be inserted between the cap portion 18 and body portion 20 of trailer coupler 16 when coupler 16 is in its open position.

Figure 4:
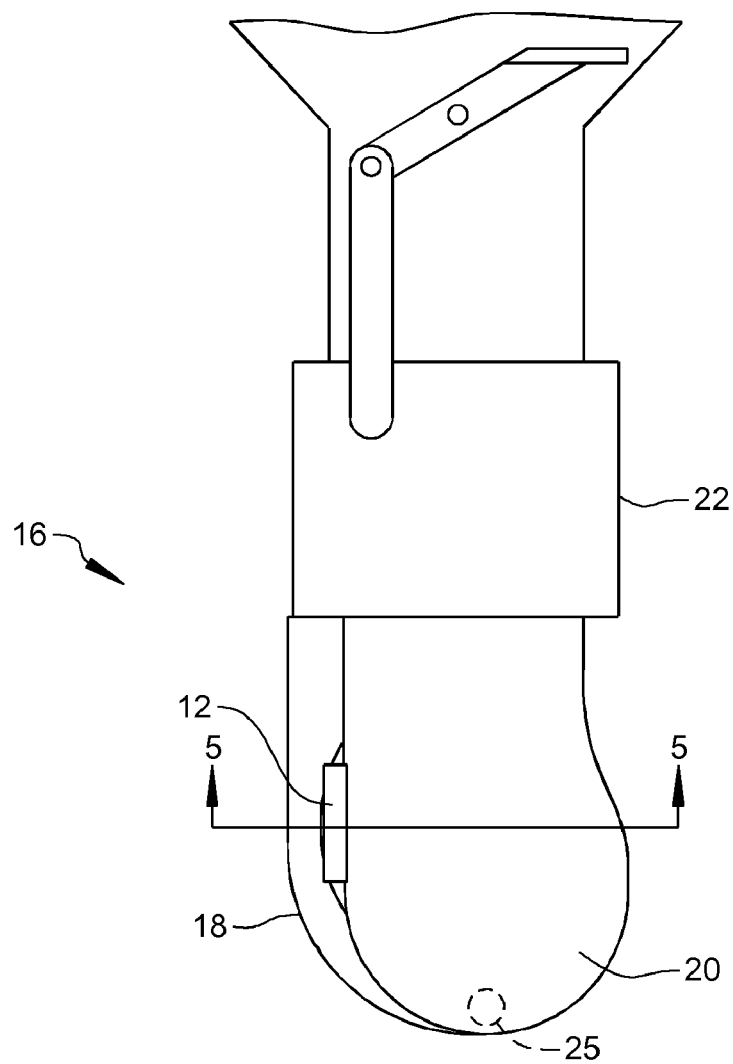
FIG. 4 is a top plan view of the device of the present invention.

Additionally, elongate tongue member 14 is sized such that when inserted, as shown in FIGS. 4 and 5, it acts as a wedge forcing cap portion 18 to rotate about the hinged area 25 and apart from body portion 20. In the preferred embodiment, elongate tongue member is approximately 0.134 inches thick at its thickest point. As such, sliding collar 22 is prevented from engaging cap portion 18, in essence, locking trailer coupler 16 in its open position.

Again referring to FIGS. 4 and 5, cylindrical bar member 12 is sized such that when elongated tongue member is inserted into trailer coupler 16, cylindrical bar member 12 rests atop trailer coupler 16. Furthermore, cylindrical bar member 12 is sized such that only cylindrical bar member 12 is visible from the top side of trailer coupler 16. In the preferred embodiment, cylindrical bar member 12 has a diameter of 0.375 inches. Thus, when device 10 is locked into place, none of elongated tongue member 14 is visible to cut or torch. Finally, as best seen in FIG. 5, elongated tongue member 14 is cut such that the shackle of conventional padlock 24 may be inserted and locked in place.

In operation, the device is simple but effective, when used as follows, as best seen in FIGS. 4 and 5. Trailer coupler 16 is first placed in the open position, with cap portion 18 and body portion 20 disengaged by sliding collar 22. Next, elongated tongue member 14 is inserted into the gap between cap portion 18 and body portion 20, wedging cap portion 18 against sliding collar 22 and preventing sliding collar 22 from being engaged. Finally, the shackle of padlock 24 is inserted through the slotted hole in elongated tongue member 14 of device 10 and locked in place in a conventional manner.

When device 10 is properly administered as shown in FIGS. 4 and 5, device 10 effectively locks trailer coupler 16 in the open position, preventing the socket portion of trailer coupler 16 from lockingly engaging a standard tow ball. Furthermore, as seen in FIG. 4, only cylindrical bar member 12 is even visible from atop trailer coupler 16 making it difficult, if not impossible, to cut or break device 10 loose from its engaged position. Additionally, as best seen in FIG. 5, elongated tongue member 14 and padlock 24 are almost completely hidden from view within the socket portion of trailer coupler 16. In fact, elongated tongue member 14 and padlock 24 are almost, if not completely, inaccessible to cut or break as well. Therefore, device 10 in a novel, yet unobvious fashion provides a solution to the deficiencies of the prior art in a discreet, effective, and inexpensive package.

Figure 6:
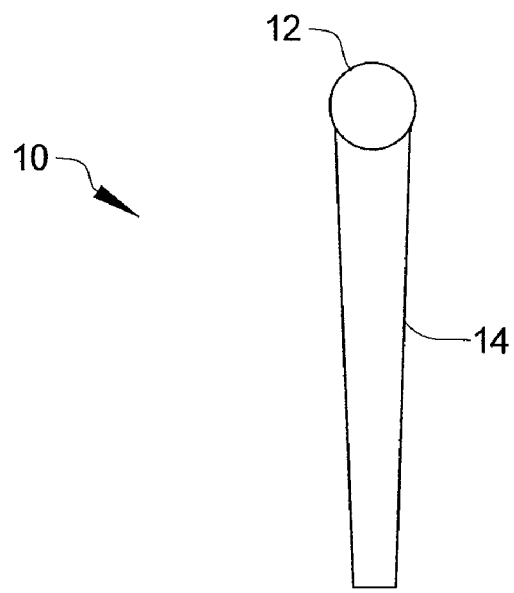
FIG. 6 is a side view of an alternate embodiment of the present invention.
Figure 7:
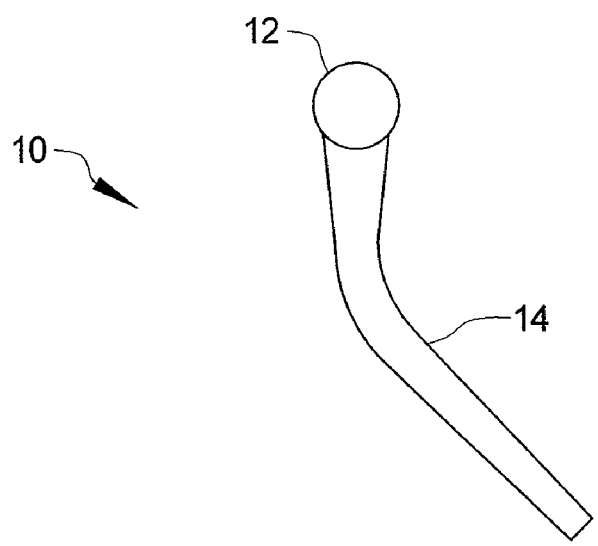
FIG. 7 is a side view of an alternate embodiment of the present invention.

In addition to the embodiment shown in FIGS. 1 and 2, an alternative embodiment is contemplated as shown in FIG. 3 wherein elongated tongue member 14 is formed at an angle. As such, this alternative embodiment of FIG. 3 may allow easier insertion of device 10 into the gap of trailer coupler 16 as well as allowing easier installation of padlock 24. Finally, both the embodiment of elongated tongue member 14 in FIG. 2 and the embodiment of elongated tongue member 14 in FIG. 3 may be drafted such that the end near the attachment of cylindrical bar member 12 is thicker than the opposite end as shown in FIGS. 6 and 7. This configuration may ease insertion of elongated tongue member 14, as well as create an even greater wedging action between cap member 18 and body member 20 of trailer coupler 16.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:

1. A device for preventing unauthorized towing of a trailer comprising:

a cylindrical bar member, said cylindrical bar member being sized to prevent insertion between the body and cap portion of a body and cap, vertically hinged trailer coupler while in the open position; and an elongated tongue member, said elongated tongue member being sized for insertion between the body and cap portion of said hinged trailer coupler while in the open position, said elongated tongue member being sized to force the cap member of said hinged trailer coupler against the end of the collar portion of said hinged trailer coupler wile in the open position, preventing the collar portion from engaging the cap portion of said trailer coupler, said elongated tongue member having a proximal end and a distal end, said elongated tongue member being permanently attached to said cylindrical bar member at said proximal end, said elongated tongue member has a slotted hole cut near said distal end, said elongated tongue member is sized to receive a padlock shackle through said slotted hole, said elongated tongue member is thicker at said proximal end of said elongated tongue member than at said distal end of said tongue member.

2. The device of claim 1 wherein said elongated tongue member is shaped to form an angle.

* * * * *